J. W. MANON.
DRINKING FOUNTAIN.
APPLICATION FILED FEB. 24, 1910.

1,074,803.

Patented Oct. 7, 1913.

Witnesses
Charles O. Frye
Harry J. McHugh

Inventor
Joseph H. Manon

UNITED STATES PATENT OFFICE.

JOSEPH W. MANON, OF CHARLEROI, PENNSYLVANIA.

DRINKING-FOUNTAIN.

1,074,803. Specification of Letters Patent. Patented Oct. 7, 1913.

Application filed February 24, 1910. Serial No. 545,653.

*To all whom it may concern:*

Be it known that I, JOSEPH W. MANON, a citizen of the United States, residing at Charleroi, in the county of Washington and State of Pennsylvania, have invented certain new and useful Improvements in Drinking-Fountains, of which the following is a specification, reference being had therein to the accompanying drawing.

The object of my invention is to combine handy and convenient features with durability in a drinking device for poultry or other animals, consisting of a storage tank, a basin, means for holding the basin securely to the tank, and providing a hanger and handle.

A further purpose of the invention is to provide a storage-tank equipped with an aperture for water or air passage and an intake air tube rendering a highly efficient automatic water service.

The invention consists in the novel construction and combination of the several parts as will be more fully set forth in the specification and claim.

Figure 1:
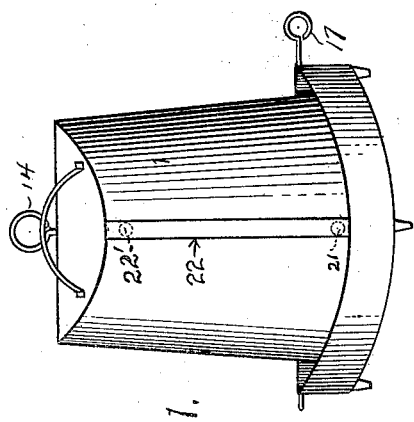
Figure 2:
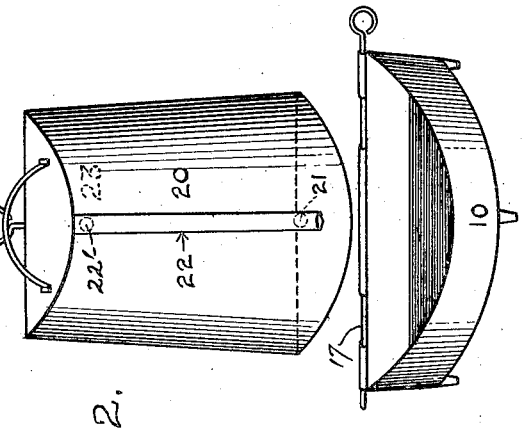
Figure 3:
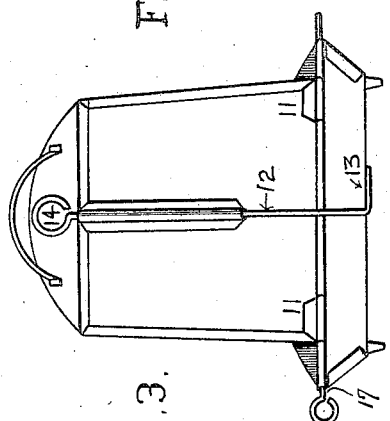
Figure 4:
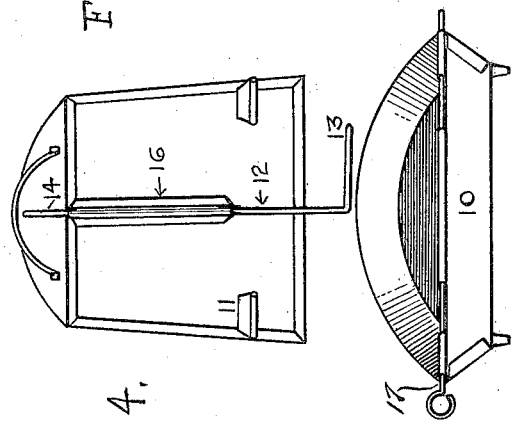
Figure 5:
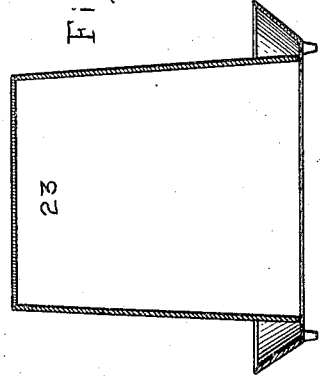

Figures 1 and 2 are front perspective views of the device with tank and basin respectively attached and detached. Figs. 3 and 4 are rear perspective views of the device with tank and basin respectively attached and detached. Fig. 5 is a vertical section showing the engagement of the tank to the basin.

1. represents the device, 10 the detachable basin, and 20 the storage-tank. The device may be made of any suitable form or material, preferably a semi-frustum of a cone in a flared basin, with a vertical plane back, thereby enabling it to hang steadily against a plane surface and usually made from sheet metal.

12 is an angled spring keeper securing the basin 10 to the tank 20, by engaging the spring arm 13 to the bottom of the basin. The keeper 12 is adapted to turn in the support 16, thereby disengaging the base arm 13 from the bottom of the basin and permitting the basin to swing on the hinge 11. The keeper 12 is also provided with an eye 14 for a hanger and handle. 17 is a removable hinge pin, thereby making the parts detachable.

The storage-tank 20 is provided with a water outlet 21, and an intake air tube 22, either integral to the tank or a separate tube, connecting the bowl of the basin at the desired water line with the upper part 23 of the interior chamber of the tank at 22'. The tube facilitates the automatic action of the water. The aperture 21 is intended also to serve as an intake for air in case the tube 22 becomes obstructed.

It will be observed that the hinge is above the water line of the basin.

In the operation of cleaning or filling the device with water, the keeper is turned disengaging the basin 10 from the tank 20. The cone shape readily permits the ice or other matter to be easily removed and by upturning the tank, the water may be filled therein and the basin fastened with the keeper.

Having thus described my invention, I claim as new and desire to secure by Letters Patent—

A drinking fountain, semi-frustum of a cone in shape, and consisting of the combination of a storage tank, a detachable basin, a disjointing hinge, the hinge attaching the basin to the tank, a keeper's support on the tank, a double purpose keeper, the keeper being held by and operated through the support, and provided with a hanger eye on one end and a spring arm on the other, thereby securing the basin in proper position to the tank, and communicating means between the tank and basin substantially as set forth and described.

In testimony whereof I affix my signature in presence of two witnesses.

JOSEPH W. MANON.

Witnesses:
CHARLES O. FRYE,
HARRY J. McHUGH.

Copies of this patent may be obtained for five cents each, by addressing the "Commissioner of Patents, Washington, D. C."